United States Patent
Marty et al.

(10) Patent No.: US 9,185,156 B2
(45) Date of Patent: Nov. 10, 2015

(54) NETWORK-INDEPENDENT PROGRAMMING MODEL FOR ONLINE PROCESSING IN DISTRIBUTED SYSTEMS

(71) Applicant: Google Inc., Mountain View, CA (US)

(72) Inventors: Michael Roger Marty, Madison, WI (US); Nicholas Andrew Kidd, Madison, WI (US); Marcus Fontoura, Mountain View, CA (US); Charles Acknin, Mountain View, CA (US)

(73) Assignee: Google Inc., Mountain View, CA (US)

( * ) Notice: Subject to any disclaimer, the term of this patent is extended or adjusted under 35 U.S.C. 154(b) by 311 days.

(21) Appl. No.: 13/767,286

(22) Filed: Feb. 14, 2013

(65) Prior Publication Data

US 2014/0136590 A1  May 15, 2014

Related U.S. Application Data

(60) Provisional application No. 61/725,702, filed on Nov. 13, 2012.

(51) Int. Cl.
*H04L 29/08* (2006.01)
*G06F 9/50* (2006.01)

(52) U.S. Cl.
CPC .............. *H04L 67/02* (2013.01); *G06F 9/5066* (2013.01)

(58) Field of Classification Search
CPC ....... G06F 9/50; G06F 9/5005; G06F 9/5027; G06F 9/5038; G06F 9/5061; G06F 9/5066; G06F 9/547; H04L 67/02; H04L 67/10; H04L 67/1002
See application file for complete search history.

(56) References Cited

U.S. PATENT DOCUMENTS

| | | | |
|---|---|---|---|
| 7,010,521 B2 * | 3/2006 | Hinshaw et al. | 1/1 |
| 8,122,150 B2 | 2/2012 | Lang et al. | |
| 2005/0131881 A1 * | 6/2005 | Ghosh et al. | 707/3 |
| 2007/0189509 A1 * | 8/2007 | Foody et al. | 380/2 |
| 2010/0185719 A1 | 7/2010 | Howard | |
| 2011/0016293 A1 * | 1/2011 | Thonnart | 712/220 |
| 2012/0102199 A1 | 4/2012 | Hopmann et al. | |
| 2012/0159424 A1 | 6/2012 | Shukla et al. | |
| 2012/0159459 A1 | 6/2012 | Turner et al. | |

(Continued)

OTHER PUBLICATIONS

International Search Report and Written Opinion for International Application No. PCT/US2013/066072, mailed Jan. 30, 2014, 8 pages.

*Primary Examiner* — Brian J Gillis
*Assistant Examiner* — Gil H. Lee
(74) *Attorney, Agent, or Firm* — Brake Hughes Bellermann LLP

(57) ABSTRACT

Systems and methods include a distributed system that uses a declarative language to separate application logic from the network technology used to communicate. For example, in a system with a plurality of processing nodes, each processing node may include at least one processor, a networking layer for communicating with other processing nodes, and a memory storing instructions that, when executed by the at least one processor, cause the processing node to perform operations. The operations may include receiving a processing plan using the networking layer and analyzing the processing plan to determine a service to perform and a number of inputs anticipated for the service. The operations may also include performing the determined service. The processing plan defines a processing tree comprising a subset of the plurality of processing nodes, the processing tree having unidirectional communication from the root to a final level of the tree.

25 Claims, 12 Drawing Sheets

(56) References Cited

U.S. PATENT DOCUMENTS

| | | |
|---|---|---|
| 2012/0191699 A1 | 7/2012 | George et al. |
| 2012/0246317 A1 | 9/2012 | Eriksson et al. |
| 2013/0013585 A1* | 1/2013 | Graefe .......................... 707/714 |
| 2013/0159286 A1* | 6/2013 | Manzano Macho et al. . 707/718 |
| 2014/0108861 A1* | 4/2014 | Abadi et al. .................... 714/11 |

* cited by examiner

NETWORK-INDEPENDENT PROGRAMMING MODEL FOR ONLINE PROCESSING IN DISTRIBUTED SYSTEMS

CROSS REFERENCE TO RELATED APPLICATION

This application claims priority under 35 U.S.C. §119 to Provisional Patent Application Ser. No. 61/725,702, filed on Nov. 13, 2012, entitled "A NETWORK-INDEPENDENT PROGRAMMING MODEL FOR ONLINE PROCESSING IN DISTRIBUTED SYSTEMS", the disclosure of which is hereby incorporated by reference in its entirety.

BACKGROUND

Distributed processing often involves dividing tasks among various processing nodes. For example, different processing nodes may store different data available for querying and processing, and a request may result in processing performed at the various nodes, with results from the nodes merged and/or selected at other nodes to form a result presented to the user. As another example, dividing computations among processing nodes may decrease the latency of certain computations, for example by breaking up the processing of a large input over a number of processing nodes, or having multiple processing nodes perform the same task and using the results of the first node to finish. Distributed systems often include instructions, in the form of software programs or modules, that control how a particular processing problem is distributed and processed. For example, many systems use remote procedure calls (RPC) to send processing requests between processing nodes. However, such systems are tied to a particular network communications protocol and to a particular flow due to the communication code existing within the application logic. Such integration results in difficulties with upgrades and portability. Furthermore, such systems lack the flexibility to deal with slow or out-of-service nodes in the distribution system.

SUMMARY

Some implementations include a distributed processing system that uses a declarative language to separate application logic from the network technology used to communicate within the system. A declarative language is a language that specifies what a process does independently of how it is done. For example, some implementations include a processing plan that includes a number of steps or operations, with each operation indicating the processing nodes associated with the operation, the service or method performed in the operation, and the input(s) used in the service. Each processing node may include a processing plan executor that receives the processing plan and executes the step or operation of the processing plan associated with the processing node. The processing node may send the processing plan and the results or output of the service, if any, to a next processing node or nodes. The processing node may identify the next node or nodes by locating operations that use the output of the service as input. Processing nodes may wait until all inputs arrive to perform the service for a particular operation. In some implementations the processing node may perform a partial service on inputs as they arrive. In some implementations, the processing node may wait a predetermined amount of time for inputs and continue processing even if all input has not arrived. Because the processing plan does not specify how each node should communicate with other nodes, application logic can be network-independent and portable. A change in network technology may be effected through a change in the processing plan executor, which may include a networking layer for communicating between nodes. This increases the speed with which a network upgrade may be accomplished while reducing the number of errors introduced during the upgrade.

One aspect of the disclosure can be embodied in a method that includes receiving a processing plan at a processing node, the processing plan including a series of operations. Each operation may include a service for the operation and an indication of one or more processing nodes for performing the service. At least one operation may also include an indication of a prior operation, so that the at least one operation uses an output of the prior operation as input. The method may also include performing the service indicated in a particular operation at the processing node, determining a next operation based on the processing plan, the next operation having an indication of the particular operation, and sending the processing plan from the processing node to another processing node, the another processing node being identified in the next operation.

The method can include one or more of the following features. For example, the series of operations may be an array of operations and the indication of a prior operation may be an index into the array and/or the indication of the one or more processing nodes in the processing plan may be a naming service. As another example, the operations of the processing plan may be stored in reverse topological order and the method may include pruning operations occurring after the next operation from the processing plan prior to sending the processing plan to the another processing node.

The method may also include, as part of performing the service, determining an anticipated amount of inputs for the particular operation, waiting for the anticipated amount of inputs to arrive, and performing the service on the anticipated amount of inputs. In some implementations, the processing plan includes a partial service and the method may further include performing the partial service on an input as it arrives at the processing node, prior to performing the service. In some implementations, the processing plan specifies that the processing nodes are replicated. In such implementations, performing the service may also include cancelling the performing of the service at other processing nodes identified in the particular operation after completion of the service. In some implementations, the processing node may send the processing plan to the another processing node without expecting a reply from the another processing node as a result of the another processing node performing the service indicated in the next operation.

In another aspect, a system is provided that includes a memory storing a plurality of processing plans, each processing plan including of a series of operations. Each operation may include a service and an indication of at least one of a plurality of processing nodes for performing the service. At least one of the series of operations may also include an indication of one or more inputs representing an output of another operation of the series of operations. The system may also include a first node of the plurality of nodes, wherein the first node includes at least one processor and a memory storing instructions that, when executed by the at least one processor, cause the first node to perform operations. The operations may include selecting a particular processing plan from the memory, and distributing the particular processing plan to second nodes of the plurality of processing nodes, the second nodes being identified in at least one first operation of the particular processing plan, the first operation having no indication of a previous operation. The system may also include the plurality of nodes, each processing node including at least one processor and a memory storing instructions that, when executed by the at least one processor, cause the processing node to receive a processing plan of the plurality of processing plans, interpret the received processing plan, and perform the service indicated in the first operation of the received processing plan.

The system can include one or more of the following features. For example, each of the plurality of nodes may include a networking layer for communicating the processing plans between the processing nodes, and/or the first node may be configured to send the processing plan to the second nodes without receiving an acknowledgement from the second nodes. In some implementations, as part of interpreting the received processing plan each of the plurality of processing nodes may also be configured to determine an anticipated number of inputs, each input being an output from a previous operation, determine whether the anticipated number of inputs have been received, and perform the service indicated when it is determined that the anticipated number of inputs have been received. In such an implementation, as part of interpreting the received processing plan, each of the plurality of nodes may further be configured to determine whether a predetermined amount of time has passed prior to receiving the anticipated number of inputs and perform the service indicated with the received inputs when it is determined that the predetermined amount of time has passed. In some implementations, where at least one of the operations in the series of operations in the received processing plan includes a partial service, as part interpreting the received processing plan, each of the plurality of nodes may be further configured to perform the partial service using each of the anticipated inputs to create an output and use the output of the partial service as input to the service indicated in the received processing plan.

In some implementations, the instructions may cause the second processing nodes to receive the particular processing plan from the first node and execute the service indicated in the first operation to generate a particular output. In such implementations, the instructions may further cause the second processing nodes to identify at least one later operation identifying the first operation and send the particular processing plan and the particular output to third processing nodes identified in the at least one later operation. In some implementations, the instructions may further cause the second processing nodes to remove at least one operation from the processing plan to generating a modified processing plan and send the modified processing plan with the output to the third processing nodes. In some implementations the second nodes may be configured to begin execution of the service concurrently and/or as part of executing the service indicated in the first operation, at least one of the second processing nodes may initiate another processing plan. In some implementations, as part of initiating the another processing plan, the at least one of the second processing nodes appends additional steps to the particular processing plan and, optionally, as part of initiating the another processing plan, the at least one of the second processing nodes modifies the indication of the one or more inputs of the later operation in the processing plan.

In another aspect, a distributed processing system comprises a plurality of processing nodes, with each processing node including at least one processor and a networking layer for communicating with other processing nodes of the plurality of processing nodes. Each processing node may also include a memory storing instructions that, when executed by the at least one processor, cause the processing node to use the networking layer to receive a processing plan, analyze the processing plan to determine a service to perform and a number of inputs anticipated for the service, and perform the service. In such implementations, the processing plan may define a processing tree comprising a subset of the plurality of processing nodes, the processing tree having unidirectional communication from the root to a final level of the tree and the next node may perform a service indicated by the processing plan. In some implementations, as part of performing the service, the next node may initiate execution of another processing plan, the another processing plan providing an output to children of the at least one processing node, the children being determined by the processing tree.

In some implementations, the distributed processing system also includes a root node, and the root node includes at least one processor, a networking layer for communicating with the plurality of processing nodes, and a memory storing instructions. The instructions, when executed by the at least one processor, may cause the root node to select the processing plan and send the processing plan to a next node using the networking layer, the next node being a child of the root node in the processing tree. In some implementations, as part of analyzing the processing plan, the processing node includes instructions that cause the processing node to determine a partial service to perform, perform the partial service on the anticipated inputs as they arrive, and use output of the partial service as input for the service. In some implementations, as part of performing the service, the memory further includes instructions that cause the processing node to determine whether a predetermined amount of time has passed prior to receiving a first input of the anticipated number of inputs and perform the service without receiving the first input.

In another aspect a tangible computer-readable storage medium having recorded and embodied thereon instructions that, when executed by one or more processors of a computer system, cause the computer system to perform any of the methods previously described.

One or more of the implementations of the subject matter described herein can be implemented so as to realize one or more of the following advantages. As one example, application logic may be decoupled from network communications, allowing processing plans to be portable and easily upgraded. The decoupling enables unidirectional communication between the nodes, so that a node does not incur a wait for a response from the called node as with bidirectional communication, such as Remote Procedure Calls. The processing plans may also be dynamic, tailored to specific applications, and allow alternative flows in a hierarchical distribution system. For example, a distributed processing system may select a processing plan for a request at the time of the request, enabling the system to account for system parameters such as load and out-of-service nodes before selecting a processing plan. The system may also take into consideration the type of request before selecting a processing plan. The processing plan itself may allow for slow or unavailable processing nodes by executing a nested processing plan for handling missing but anticipated inputs. Some implementations may have optimizations, such as reducing the size of the processing plan as it propagates and executing partial methods as inputs are received. Furthermore, because the processing plans include instructions for where the next processing occurs but not how to communicate with the next processing node(s), the processing plans can be ported between systems using different network communications protocols without changes and may use upgraded communication protocols without recompiles or other changes.

The details of one or more implementations are set forth in the accompanying drawings and the description below. Other features will be apparent from the description and drawings, and from the claims.

BRIEF DESCRIPTION OF DRAWINGS

Like reference symbols in the various drawings indicate like elements.

DETAILED DESCRIPTION

Figure 1:
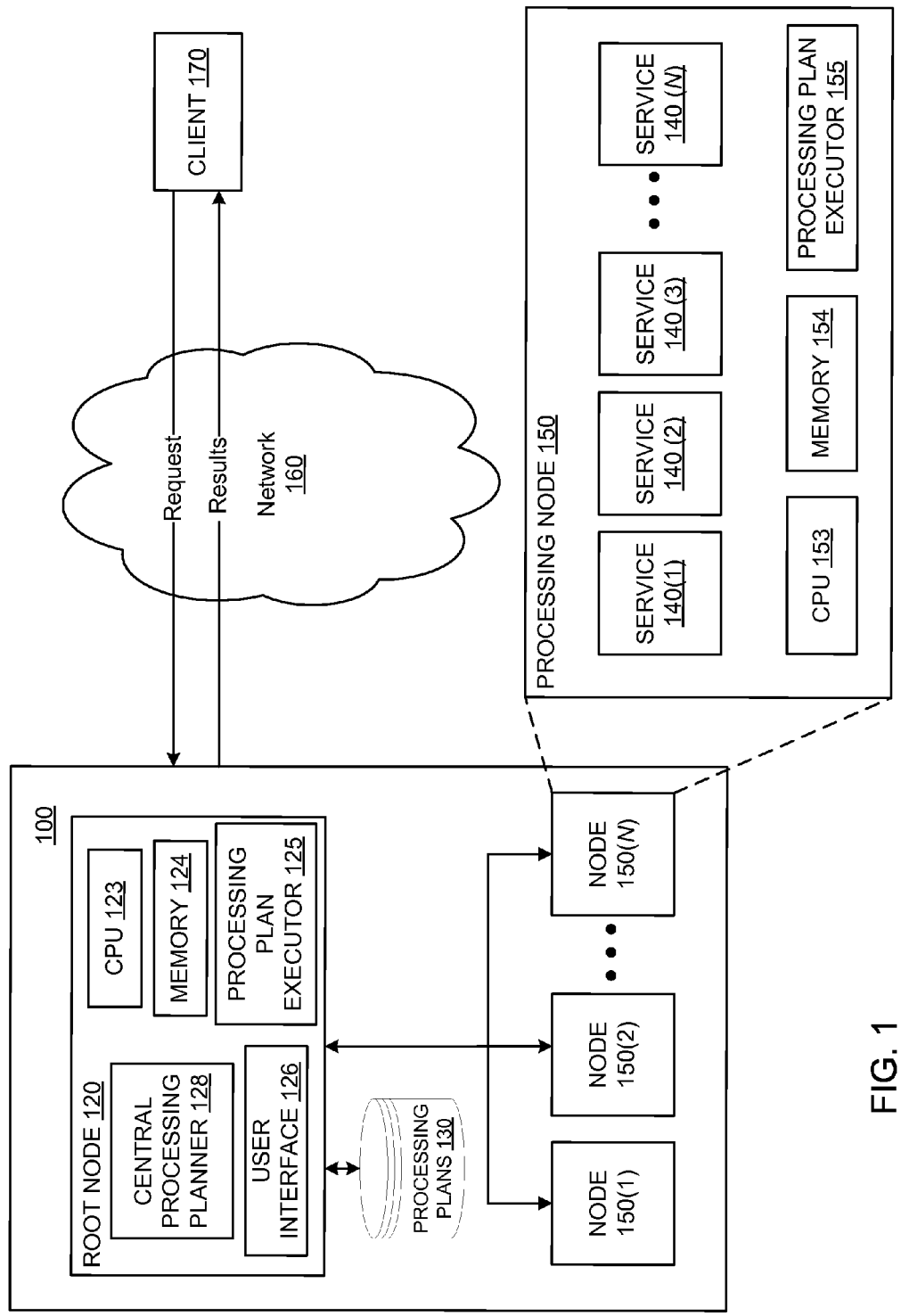
FIG. 1 illustrates an example system in accordance with the disclosed subject matter.

FIG. 1 is a block diagram of a distributed processing system 100 in accordance with an example implementation. The system 100 may be used to implement a distributed processing system using the techniques described herein. The depiction of system 100 in FIG. 1 is described as a distributed processing system that processes requests from a client. Other configurations and applications of the described technology may be used. For example, the request may originate from another server, from a batch job, or from a user terminal in communication with distributed processing system 100.

Figure 13:
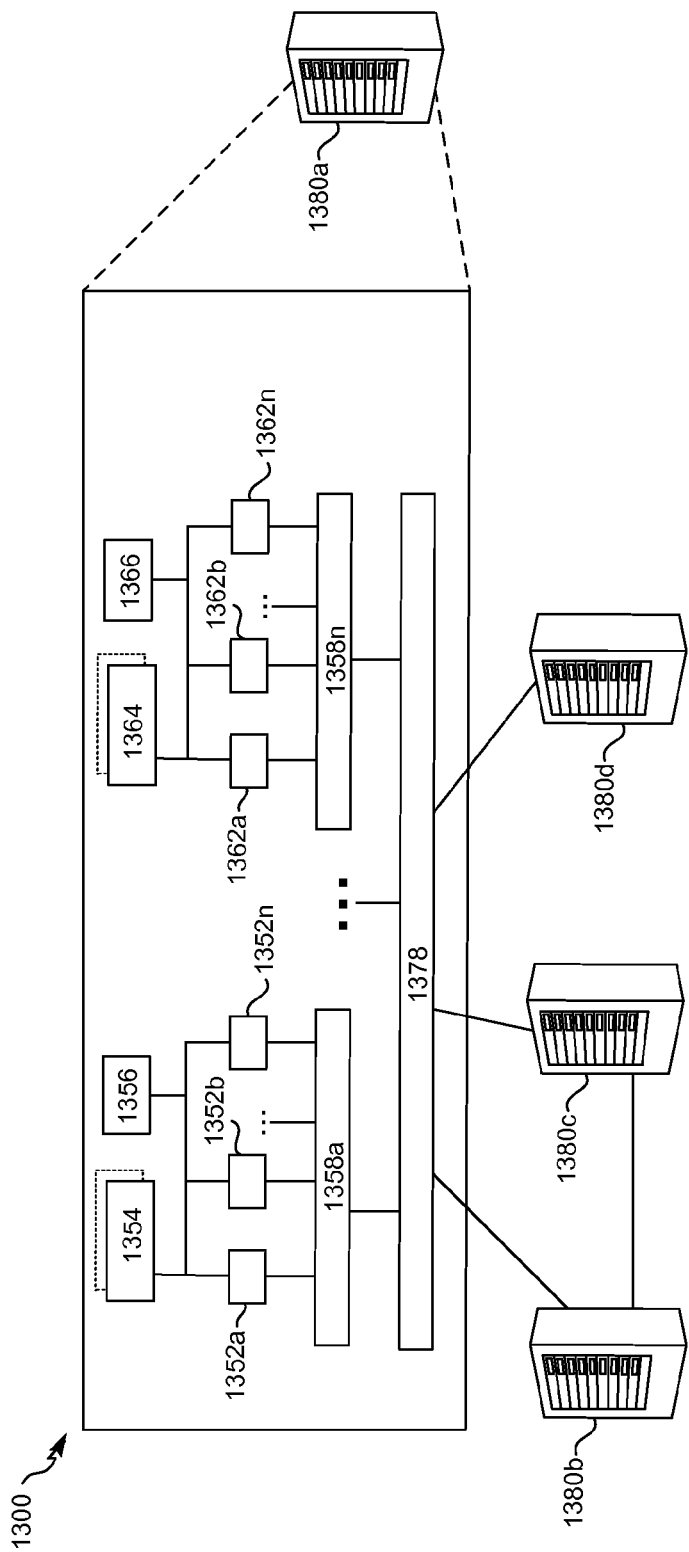
FIG. 13 shows an example of a distributed computer device that can be used to implement the described techniques.

The distributed processing system 100 may include root node 120, and a plurality of processing nodes 150 in communication with the root node 120. Root node 120 and processing nodes 150 may be computing devices that take the form of a number of different devices, for example a standard server, a group of such servers, or a rack server system. In addition, root node 120 and processing nodes 150 may be implemented in a personal computer, for example a laptop computer. The root node 120 and processing nodes 150 may be examples of computer device 1300, as depicted in FIG. 13.

Root node 120 can include one or more processors 123 configured to execute one or more machine executable instructions or pieces of software, firmware, or a combination thereof. The root node 120 can include, an operating system (not shown) and one or more computer memories 124, for example a main memory, configured to store one or more pieces of data, either temporarily, permanently, semi-permanently, or a combination thereof. The memory may include any type of storage device that stores information in a format that can be read and/or executed by processor 123. Memory 124 may include volatile memory, non-volatile memory, or a combination thereof, and store modules that, when executed by processor 123, perform certain operations. In other implementations, the modules may be stored in an external storage device (not shown) and loaded into memory 124. The modules may include processing plan executor 125, user interface 126, and central processing planner 128. User interface 126 may enable root node 120 to receive requests for processing. For example, requests may be submitted by client 170, by another server system, by a batch job, or by a user of distributed system 100. User interface 126 may also allow distributed system 100 to provide results or a display to the requestor. Central processing planner 128 may enable root node 120 to analyze the request and to select a processing plan, for example from processing plan library 130, appropriate for the request. Processing plan executor 125 may allow the root node 120 to analyze the selected processing plan and the send the selected plan to one or more of processing nodes 150. Although shown in FIG. 1 as a separate node, root node 120 may be one of processing nodes 150. In other words, any of processing nodes 150 may be considered a root node 120 configured to receive and analyze requests from a user, to select an appropriate processing plan to service the request, and to pass the selected processing plan to one or more processing nodes 150 for execution.

System 100 may also include a number of processing nodes 150. Processing nodes 150 may be a single computing device or a distributed system with one or more computing devices, each with its own processor and memory. The number of computing devices that comprise processing nodes 150 can vary according to system requirements. Each of processing nodes 150 can include one or more processors 153 configured to execute one or more machine executable instructions or pieces of software, firmware, or a combination thereof. Each processing node 150 can also include, an operating system (not shown) and one or more computer memories 154, for instance a main memory, configured to store one or more pieces of data, either temporarily, permanently, semi-permanently, or a combination thereof. Memory 154 may include any type of storage device that stores information in a format that can be read and/or executed by processor 153, including volatile memory, non-volatile memory, or a combination thereof. A processing node 150 can also include one or more services 140. Services 140 may be methods or functions that can be performed by processing node 150. For example, service 140(1) may read records from a database, service 140(2) may write records to a log, service 140(3) may generate random numbers, etc. Each processing node 150 may also include a processing plan executor 155. Processing plan executor 155 may include a network layer that allows processing node 150 to communicate with other nodes in distributed processing system 100. Processing plan executor 155 may also receive processing plans from other nodes, determine what step of the processing plan to execute, determine which of services 140 to invoke, determine the number of inputs from prior steps used in the service, invoke the service at the appropriate time, and send the processing plan and the output of the service to other nodes in the distributed processing system 100, if needed. Thus, while the processing plans 130 are network-independent, processing plan executor 155 may work with a particular network communications protocol.

Root node 120 may be in communication with clients 170 and root node 120 and processing nodes 150 may be in communication with each other over one or more of network 160. Network 160 may be for example, the Internet or the network 160 can be a wired or wireless local area network (LAN), wide area network (WAN), etc., implemented using, for example, gateway devices, bridges, switches, and/or so forth. Via the network 160, the root node 120 may communicate with and transmit data to/from clients 170 and the root node 120 and processing nodes 150 may communicate with and transmit data to/from each other.

Figure 2:
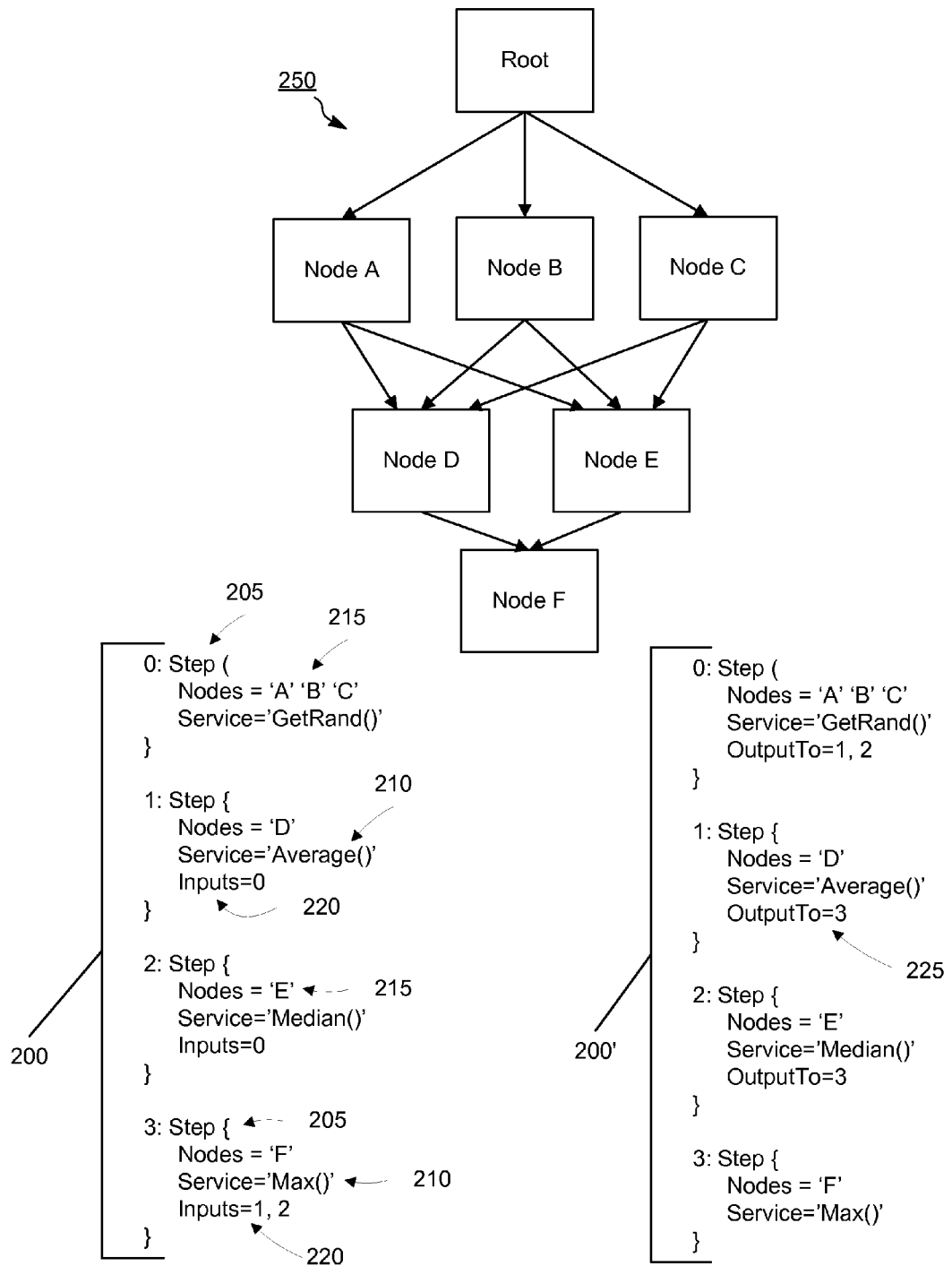
FIG. 2 illustrates an example of a processing plan for a distributed processing environment and a processing tree that corresponds to the processing plan, in accordance with disclosed implementations.

FIG. 2 illustrates an example of a processing plan 200 for a distributed processing environment and a processing tree 250 that corresponds to the processing plan 200, in accordance with disclosed implementations. Processing plan 200 includes a series of operations or steps 205. Each step may include a service or method 210 and an indication 215 of the processing nodes that perform the service. Services represent application or business logic and can include any function or method that a particular node may perform. In the example of FIG. 2, the services include GetRand( ), which generates a random number, Average( ), which calculates the average of a set of numbers, Median( ), which calculates the median of a set of numbers, and Max( ), which calculates the highest number of a set of numbers and generates output for a display device that displays the maximum number.

The indication 215 of the nodes that perform the service identified in the step may be an address or other identifier for the physical nodes or the indication may include a name service. A name service maps an alpha-numeric string to the physical node, similar to a URL mapping to a particular web address. The name service allows the processing plan to be generic, so that the plan can be ported to another system with only a change to the mapping. In some implementations, the mapping may be stored or accessed through the processing plan executor at each node. In some implementations several processing nodes may be mapped to a single name, and use of the single name in a particular step of the processing plan may result in execution of the particular step at each of the several processing nodes.

Processing plans may define a processing tree, with each step representing a level of the processing tree. The steps that do not include an indication of prior steps may be considered the first level of the tree. For example, processing plan 200 defines processing tree 250 illustrated in FIG. 2. The processing plan may be propagated from the root of the processing tree to the final levels of the tree in a unidirectional manner. For example, if a processing plan calls for information to be collated at the root node after it has been obtained and processed at other nodes in other levels of the tree, the processing plan may identify the root node as the a node in a final level of the tree. Otherwise, the root node may not have an opportunity to receive information back from other nodes in the tree.

Some steps 205 of processing plan 200 may include an indication 220 of one or more prior steps that provide input used in the step. In some implementations the steps 205 may be stored as an array and the indication 220 may be an index into the array. In some implementations each of the steps 205 may be associated with an identifier and the indication 220 may be one of the associated identifiers. The indicated prior steps may provide output to be used as input for a particular step. For example, in FIG. 2 step 1 uses the output of step 0 as input and step 3 uses the output of steps 1 and 2 as input. Because step 0 of plan 200 includes three processing nodes, the node of step 1 of plan 200, e.g. node D, may anticipate three inputs before proceeding. Processing tree 250 depicts this visually, as node D is depicted with three inputs.

A step without an indication 220 of prior steps, such as step 0 in FIG. 2, may be invoked from a beginning or root node. Although only one step in FIG. 2 lacks a prior step indication 220, two or more steps in the processing plan may lack the indication 220. In some implementations, the root node may invoke each of the steps lacking a prior step indication 220 concurrently. While processing plan 200 describes a flow, or processing tree, to carry out the plan, the processing plan 200 does not indicate how the nodes communicate with each other. For example, in current distributed processing systems, if the service at node A needs to invoke a service on node D, the service at node A includes code, such as remote procedure calls, to remotely invoke the service. Unlike such conventional methods, the services used by processing plan 200 do not need to include the remote procedure calls or any other network communication code. As described above, communication between nodes in the distributed processing environment may be facilitated by a processing plan executor, such as processing plan executor 155 of FIG. 1, at each node. The processing plan executor may include a network communications layer that determines how nodes communicate. Thus, while processing plan 200 indicates that node A should send output to nodes D and E, it may not provide guidance on how this is accomplished. Such an arrangement allows distributed processing system 100 to separate the application logic from network communications protocols.

The query plan 200 of FIG. 2 demonstrates a query plan where the edges of the processing tree are encoded by indicating the steps that provide input to a step. In some implementations, such as query plan 200' of FIG. 2, the edges may be encoded as outputs rather than as inputs. For example, step 0 may include an indication 225 that the output of the nodes A, B, and C goes to steps 1 and 2, or to nodes D and E. Thus, in some implementations, the query plan executor may use the indication 225 to determine where to send the query plan. In such implementations, a query plan executor may still determine the number of expected inputs by determining the number of steps that send output to the current step and the number of nodes identified in those steps.

Figure 3:
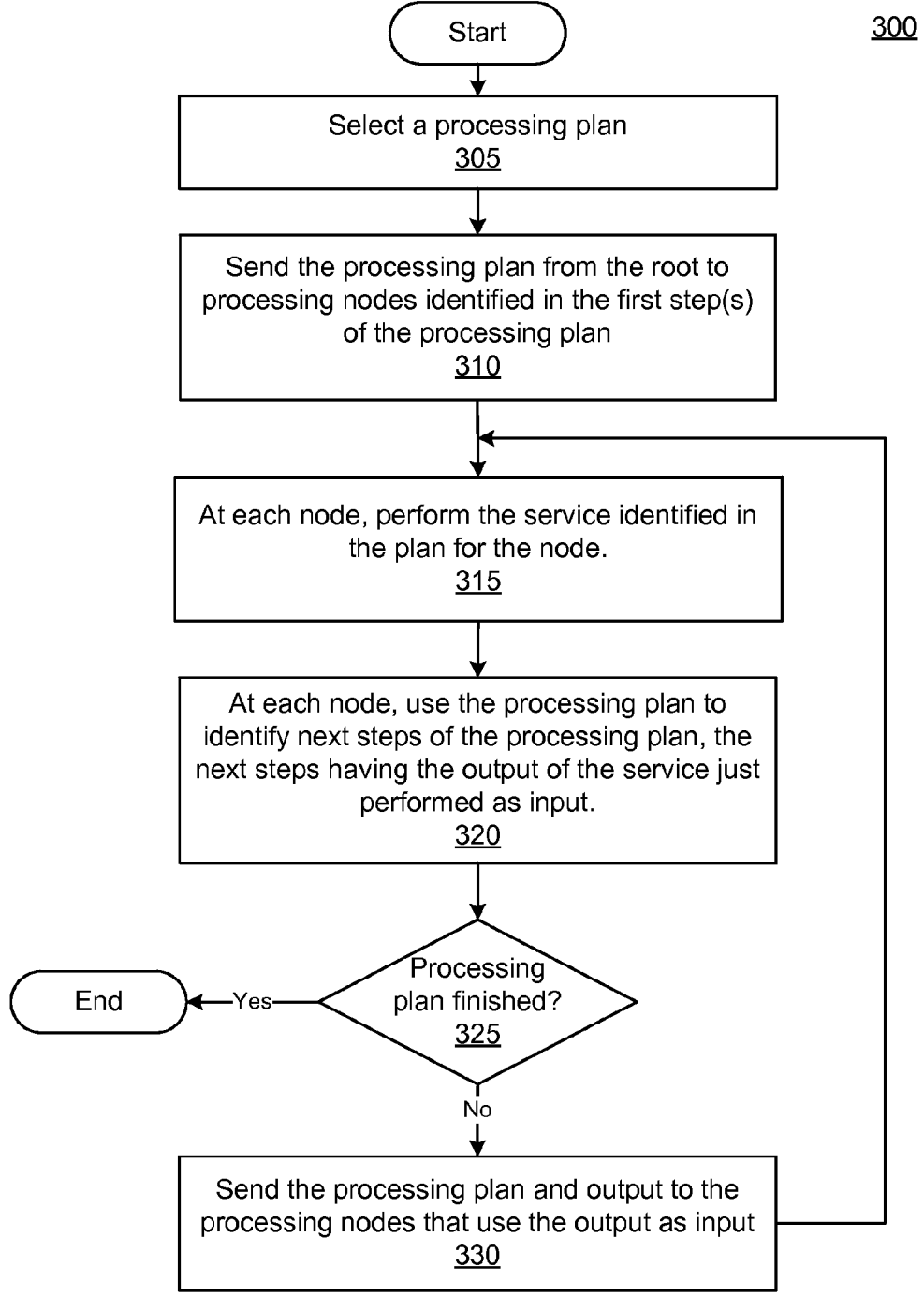
FIG. 3 illustrates an example of a flow diagram for executing a processing plan, in accordance with disclosed implementations.

FIG. 3 illustrates an example of a flow diagram of a process 300 for executing a processing plan, in accordance with disclosed implementations. Process 300 shown in FIG. 3 may be performed at least in part by root node 120 and processing nodes 150 as shown in FIG. 1. Process 300 may begin with the root node selecting a processing plan (305). In some implementations the root node may include a module, such as central processing planer 125 of FIG. 1, that chooses a processing plan appropriate for the request. For instance, the root node may inspect attributes of the request and match the attributes with an appropriate processing plan. Selecting a processing plan based on attributes of the request may enable the root node to tailor the processing for a particular customer, based on the load and/or status of the system, or the type of data requested. For example, a particular customer may have a service level agreement that provides a particular customer with a faster response time to requests than requests from other customers. Accordingly, when the root node receives a request associated with the particular customer the root node may select a processing plan that provides improved latency over other plans. Or, the root node may have access to information that indicates particular nodes are busy or otherwise unavailable. Accordingly, the root node may select a processing plan that minimizes or eliminates the use of those nodes. As another example, the root node may determine that the request involves a specific kind of data and choose a plan based on that. For example, the request may be class-based, such that the root node may determine whether the request is for a document type, an audio type, or for an image type and choose one processing plan for documents, another for audio, and yet another for images. Or, the root node may determine that the request pertains to characteristics that make cache processing more desirable and, thus, select a processing plan that includes processing nodes with cached results. The foregoing represents a few examples of how a root node may select a processing plan, and implementations may use other attributes to select an appropriate processing plan. Other examples will be apparent having the benefit of this disclosure.

After selecting a processing plan, the root node may send the processing plan to processing nodes identified in the first step or steps of the processing plan (310). The first steps may be steps that have no indication of prior steps, such as step 0 of plan 200 in FIG. 2. Because the first steps do not include input from prior steps to wait for, the nodes indicated in the first steps can begin processing immediately and the root node may send the processing plan to the nodes indicated in these steps. In some implementations the root node may send the processing plan to the nodes indicated in the first steps concurrently, so that each node may begin its processing. Using the example of FIG. 2, the root node may send the processing plan and, optionally, information from the request, to each of nodes A, B, and C because these nodes are indicated in step 0 of processing plan 200.

The root node may include a processing plan executor that controls the sending of messages and other information to and receiving messages from other nodes in the distributed system. The processing plan executor may include a networking layer with the protocols and functions that allow the root node to send the processing plan and other information to the processing nodes. For example, the processing plan executor may use User Datagram Protocol (UDP), Transmission Control Protocol (TCP), Stream Control Transmission Protocol, (SCTP), Xpress Transport Protocol (XTP), etc., to send the processing plan to the processing nodes. If a systems administrator wanted to upgrade the system to use a different network protocol, for example, changing from UDP to SCTP, the systems administrator may upgrade the processing plan executor on the root and processing nodes to use the new version, but would not need to make changes to or recompile the processing plans.

After receiving a processing plan, each processing node may then perform the service or method identified in the processing plan for the node (315). Using FIG. 2 as an example, nodes A, B, and C may begin the random number generation. In some implementations, in addition to sending the processing plan to the processing nodes, the root node may provide all or part of the original processing request or an additional parameter, such as a seed, to nodes A, B, and C for use in performing the service. Performing the service may include multiple tasks, as explained below with regard to FIG. 4.

Once a processing node has completed performance of its service, the processing node may use the processing plan to identify a next step or steps in the processing plan (320). The next steps may be the steps in the plan that use the output of the service just performed as input. For example, the processing plan may include step identifiers as input for a particular step. Thus, a processing node may look for steps that include the identifier of the step it just completed. If no steps exist that use the output of the service as input, the processing plan has finished (235, Yes) as far as the processing node is concerned. Other processing nodes may continue to perform services if called for by the processing tree. For example, if processing plan 200 of FIG. 2 did not include step 3, node D, as part of step 1, may complete its service while node E as part of step 2 is still performing its service. If the processing node does identify next steps, it may send the processing plan and the output to the processing nodes identified in the next steps (330). For example, in FIG. 2, steps 1 and 2 use the output of step 0 as input. Thus, when node A completes processing of its service, it may determine that the next steps are steps 1 and 2. Accordingly, node A may send a message to nodes D and E. The message may contain the processing plan and the output from A, e.g., a random number. Similarly, when node F has completed its service (in step 3), node F may determine that no steps identify step 3 as providing input and, therefore, the plan has completed. Thus, node F may not send the processing plan or any messages as a result of finishing the service.

Figure 4:
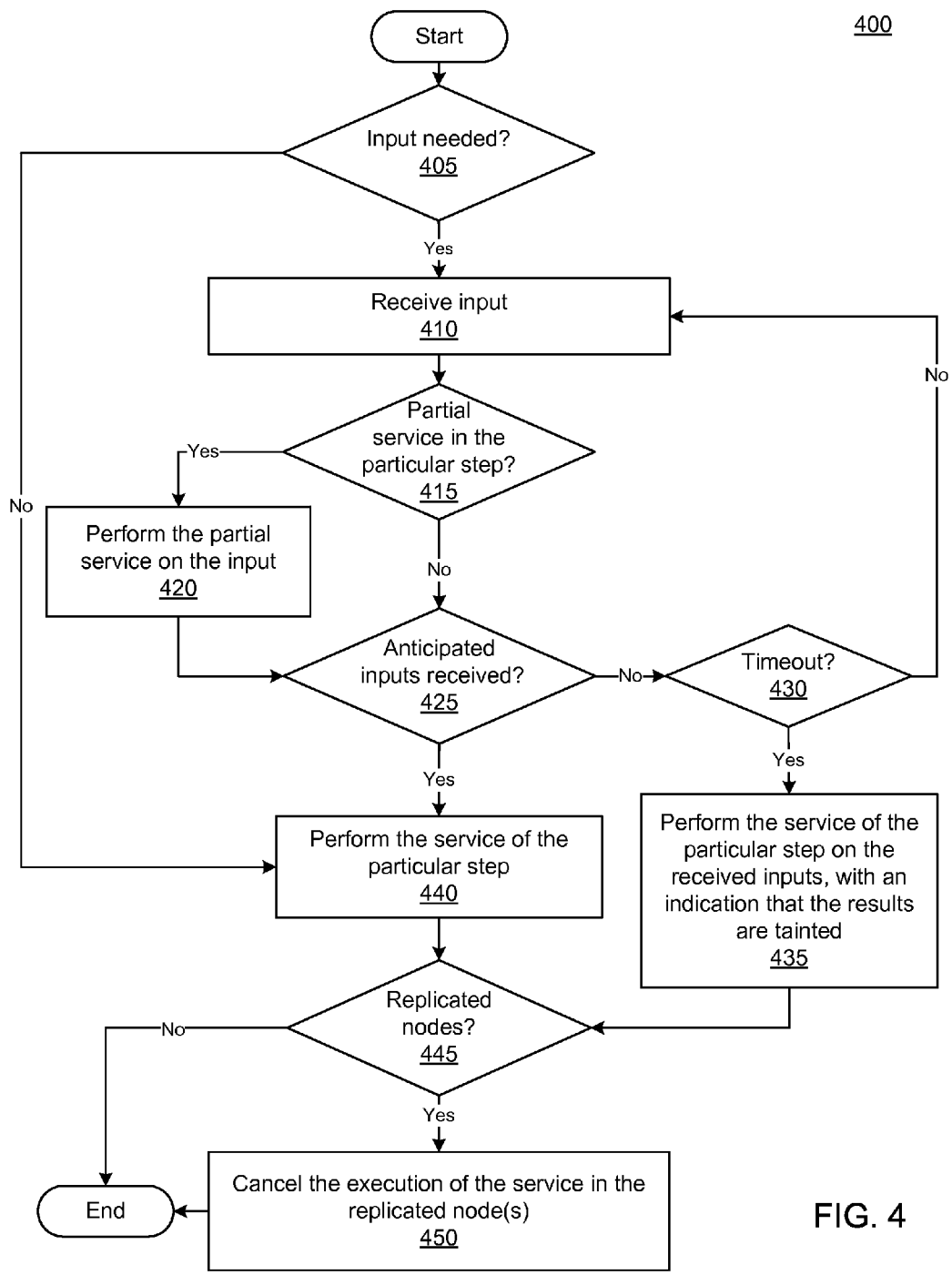
FIG. 4 illustrates a flow diagram of an example of performing a service at a node in the distributed processing environment, in accordance with disclosed implementations.

FIG. 4 illustrates an example of a flow diagram for a process 400 for performing a service at a node in the distributed processing environment, in accordance with disclosed implementations. A processing node may perform process 400 as part of step 315 of FIG. 3. Process 400 may be performed for a particular step, the particular step of the processing plan being the step that the processing node has been identified in and asked to perform. As part of performing the service, the processing node may determine whether input is needed (405). For example, a processing node executor of the processing node may look for an input statement in the particular step of the processing plan that identifies prior steps. In the example of FIG. 2, step 0 has no input identified. Thus, nodes A, B, and C in performing the service of step 0 will determine that no input is needed (405, No). Accordingly, nodes A, B, and C may perform the service of the particular step (440) without delay. Also in the example of FIG. 3, step 2 has identified step 0 as providing input. Thus, node E may determine that input is needed (405, Yes).

If input is indicated for the particular step (405, Yes), then the node will receive the input (410). In some implementations, the input may be sent with the processing plan from a previous processing node in the processing tree. In some implementations the input may be sent separately from the processing plan, and may be sent at a later time than the processing plan. When the processing node receives the input, the processing plan executor may determine whether the particular step includes a partial service (415). A partial service is a service or method that may be performed on input as it arrives, prior to using the input in the main service. As an example, in the processing plan illustrated in FIG. 5, step 3 includes a partial service that extracts information from the input before the input is used by the loge service. When the particular step includes a partial service (415, Yes), the processing node may perform the partial service on the input (420).

The processing node may determine whether all of the anticipated inputs have been received (425). For example, in FIG. 5, node D receives input from steps 0, 1, and 2. Thus, D expects to receive three inputs. In some implementations, query plan 500 could be created with two steps, where step 0 identifies nodes A, B, and C, similar to steps 0 and 1 of query plan 200 of FIG. 2. In such a query plan, because step 0 includes three processing nodes, node D still expects to receive three inputs, one from each of nodes A, B, and C. If the processing node has not received the anticipated input, (425, No), the processing node may optionally determine whether a predetermined amount of time has passed (430). This may happen, for example, when a node is offline, busy, or slow for some other reason. To determine if a predetermined amount of time has passed the processing node may use a timer, for example, started when a first input is received in step 410. If the timer has not yet expired, for example if the predetermined time has not been reached (430, No), the processing node may continue to wait for input (410). Although not depicted in FIG. 4, the processing node may check the timer periodically, or the expiration of the time may cause processing node to perform step 430, so that the processing node may detect the end of the predetermined time. If the processing node has not received the anticipated inputs by a predetermined time (430, Yes), the processing node may begin the service for the particular step with the inputs that it has received (435). In implementations that allow proceeding with less than the expected number of inputs, the service may be written to allow for the missing inputs. For example, the service may include an indication that the output is tainted, may write an error to a log or otherwise notify a user that one or more inputs were missing, or the service may invoke another processing plan, e.g., a nested plan, as explained in more detail below. If the processing node does not perform step 430 and all anticipated inputs are not received (425, No), the processing node may continue to wait for the anticipated input to arrive and proceed with step 410 as an input arrives.

Figure 7:
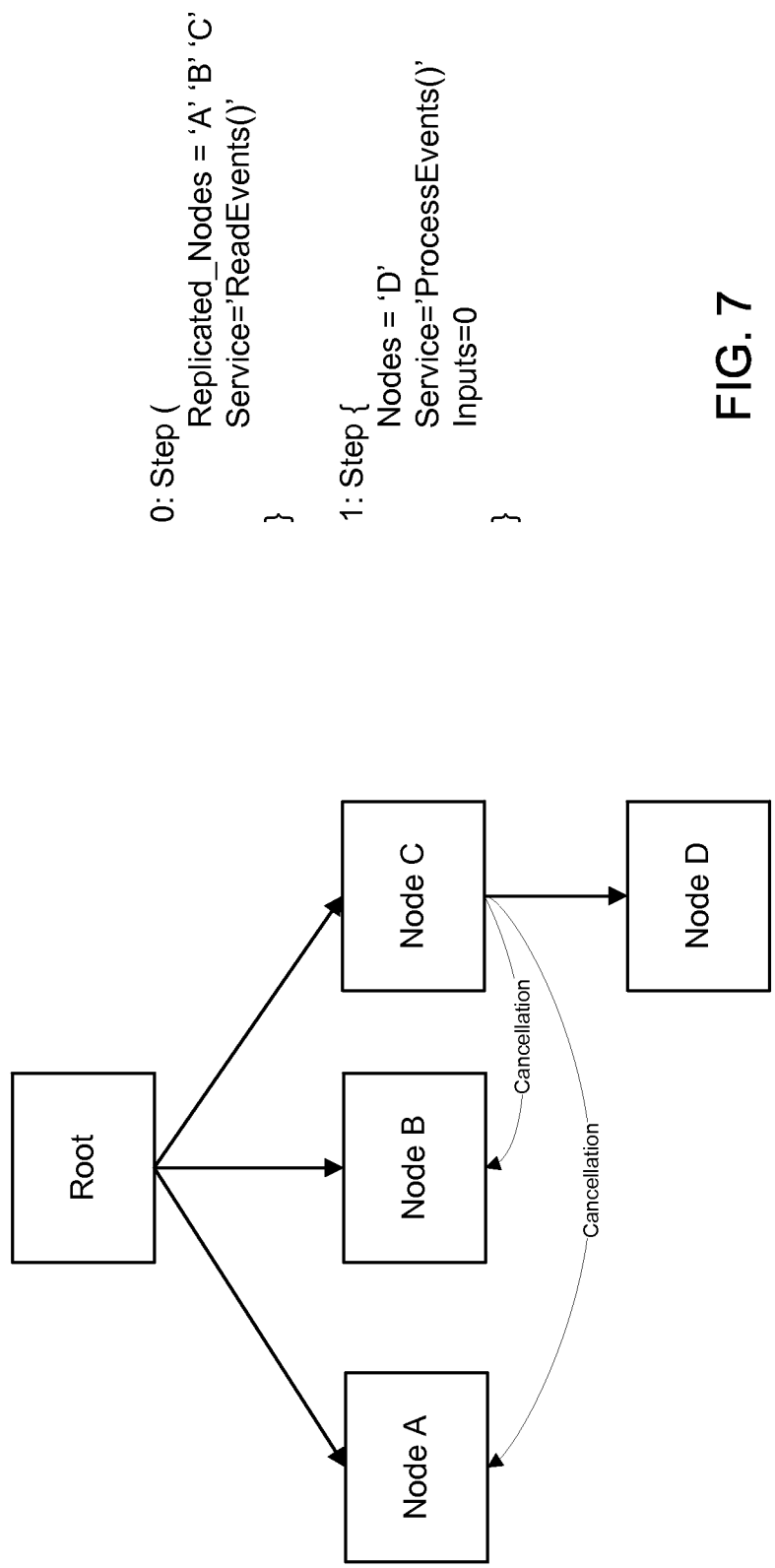
FIG. 7 illustrates a processing plan with cancellation of replicated nodes to achieve low latency, and a corresponding process flow, in accordance with disclosed implementations.

If the processing node has received the anticipated input (425, Yes), the processing node may perform the service identified in the particular step (440). In some implementations, the processing plan executor may perform type checking on the inputs before performing the service. If the types do not match, the processing plan executor may generate an alert or a log message, may ignore the input and perform the service with partial inputs, similar to step 435, may use a NULL pointer as missing input, or may use a default value or set of values for the missing input. After the processing node has completed performance of the service, either with all anticipated input (440) or without at least one input (435), the processing node may determine whether the particular step includes replicated nodes (445). A distributed system may use replicated nodes when low latency is a priority in responding to requests. For example, three distributed processing nodes may contain the same data, so that a service performed on each of the three nodes would provide the same answer. A request that values low latency may send the same request to three different nodes and use only the output of the first node to finish. FIG. 7 illustrates and example of a processing plan with replicated nodes, and a corresponding process flow. As illustrated in FIG. 7, nodes A, B, and C of step 0 are identified as replicated. Each of nodes A, B, and C begin the readEvents( ) service at about the same time, but node C finishes first. Node C thus sends the processing plan to node D and sends a message to nodes A and B that causes nodes A and B to cancel the readEvents( ) service. Thus nodes A and B do not send results or the processing plan to node D. Thus, returning to FIG. 4, if the service completes and the particular step has replicated nodes (445, Yes), the processing node may send a message to the replicated node or nodes that cancels the execution of the service on those nodes. If the particular step does not include replicated nodes (445, No) or after the cancellation messages have been sent, process 400 completes. Although depicted in FIGS. 3 and 4 in a particular order, the steps of processes 300 and 400 need not be performed in the order shown.

As previously mentioned, a processing node may invoke a nested processing plan. A nested processing plan may be used, for example, when a processing node does not have the information it needs to complete the service. For example, the processing plan 500 of FIG. 5 asks each of nodes A, B, and C to read records from a cache and send the records as input to node D. Node D may extract information from the inputs, which are the output of nodes A, B, and C, and create a log record from the three inputs. However, if node A cannot locate events in the cache, it may invoke a nested processing plan to retrieve the events from disk and place them in cache. The nested plan may replace the edge from A to D in the processing tree 550.

Figure 5:
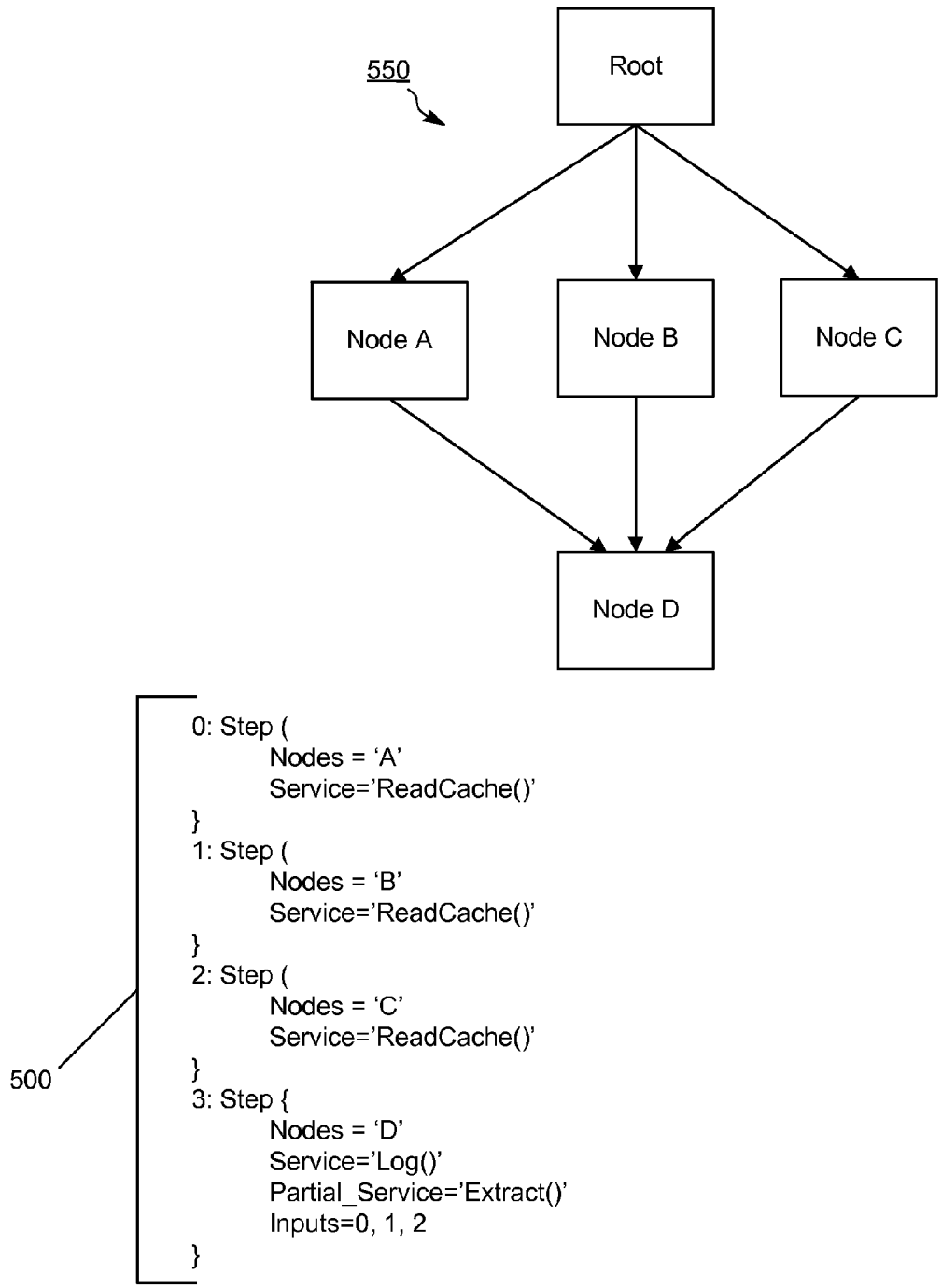
FIG. 5 illustrates a processing plan and a corresponding processing tree for a processing plan with partial services.
Figure 6:
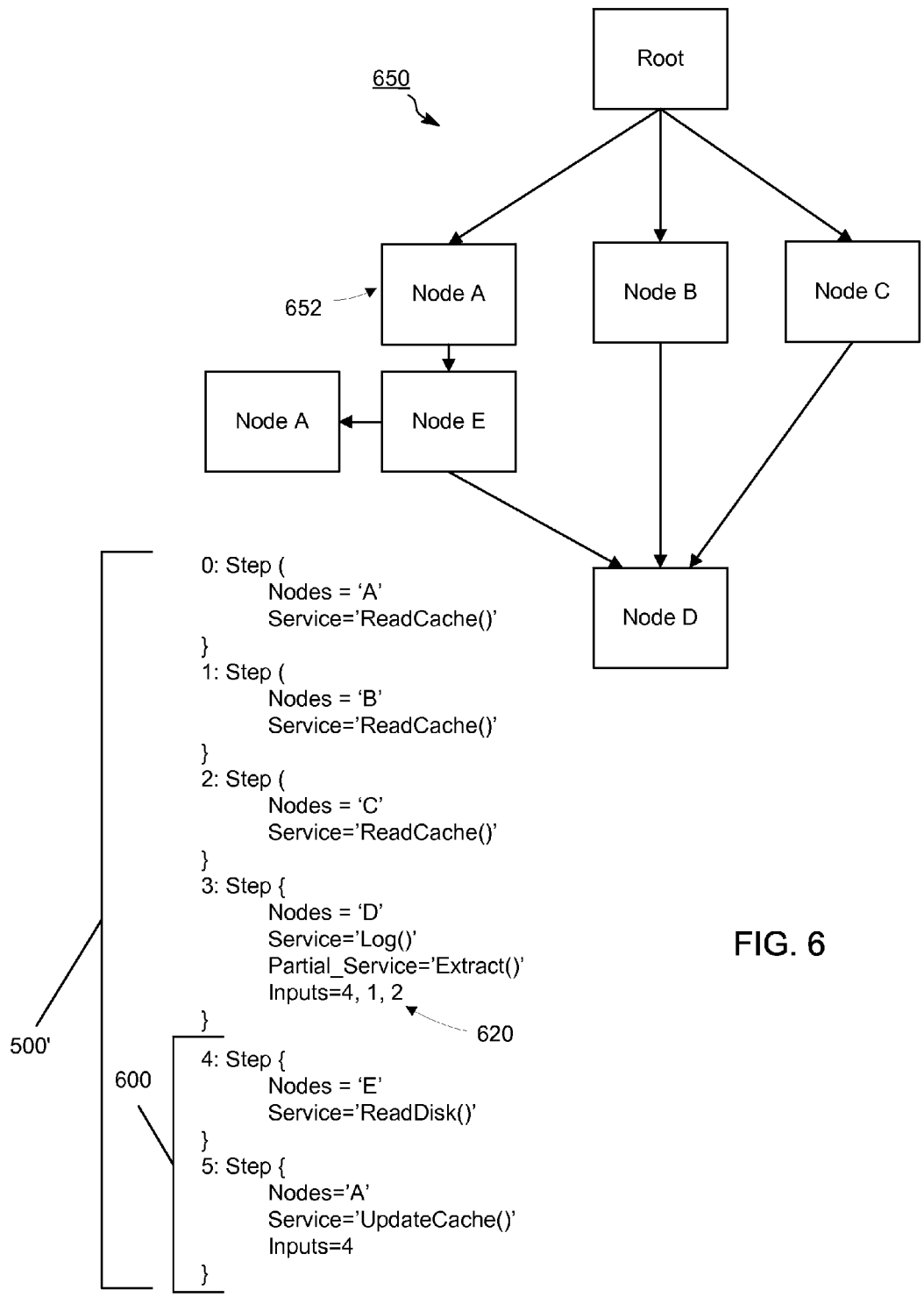
FIG. 6 illustrates the processing plan of FIG. 5 with a nested plan, and a corresponding processing tree.

FIG. 6 illustrates the processing plan 500 of FIG. 5 with a nested plan 600 initiated by node A, and a corresponding processing tree 650. In the example of FIG. 6, node A at 652 may determine that it cannot complete its service. For example, as part of the readCache( ) service, node A may determine that the cache is empty. Accordingly, node A may invoke a nested processing plan, such as processing plan 600 to retrieve records from disk. Node A may invoke the nested plan by appending processing plan 600 to plan 500, creating processing plan 500'. In this example, node A becomes the root node for processing plan 600, and sends plan 500' to node E. Node E may perform the readDisk( ) service without waiting for input, because no input is indicated. The readDisk( ) service may retrieve the records from disk. Node E may send the output and processing plan 500' to node A. Node A may perform an updateCache( ) service to place the records in cache, so that the records are loaded for further processing needs. Because no steps use the input from step 5, this portion of processing plan 500' completes.

Node E also sends its output and processing plan 500' to node D. In creating processing plan 500', node A delegates the responsibility for sending input to node D to node E. To reflect this delegation, the input 620 for step 3 is changed in processing plan 500' from "0, 1, 2" to "4, 1, 2." Changing the input of node D accomplishes the replacement of the edge from the original node A (652) to node D with the nested plan. Thus, using a nested processing plan, Node D continues to receive the three expected inputs and processing plan 500 continues at node D without knowledge of the nested plan.

In the example of FIG. 6, node D receives two versions of the query plan. Node D receives plan 500 from nodes B and C and plan 500' from node A. However, both plans are consistent in that D expects three inputs in each. Therefore, the difference in plans does not matter to node D. This is because node D does not care about the steps of the plan that have already been executed, for example the steps that sit above it in the processing tree 650. Thus, nested plans such as plan 600 may be appended to the query plan without disrupting the rest of the tree, so long as the nested plan replaces one edge in the processing tree and is consistent with the original plan, as demonstrated in FIG. 6.

Figure 8:
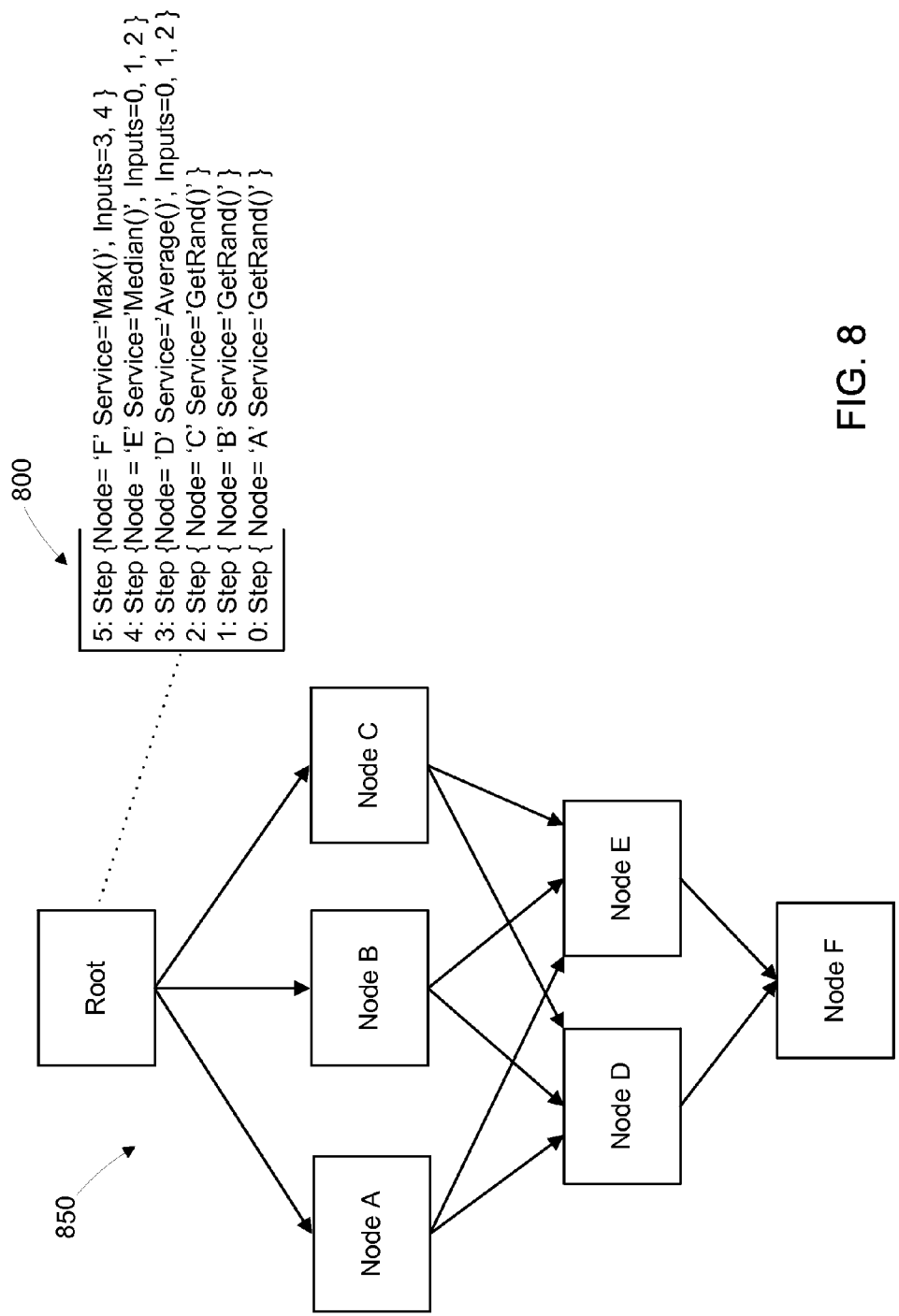
FIG. 8 illustrates another processing plan and corresponding processing flow.

Although described so far as sending the entire processing plan between nodes, in some implementations, each processing node may send a portion of the plan to the next node or nodes. For example, the root node may sort the steps of the processing plan in reverse topological order, so that the first steps, e.g., the steps without input, appear last in the list and final nodes appear first. FIG. 8 illustrates an example of a processing plan 800 sorted in reverse topological order, along with corresponding processing tree 850. As illustrated, node F represents a terminal node in the plan, and therefore appears first in the sorted list. Nodes D and E, which provide input to node F, appear next in the sorted list, and nodes A, B and C appear last. With the processing plan 800 in reverse topological order the root node may prune the plan before sending to the next nodes, in this example, nodes A, B, and C.

Figure 9:
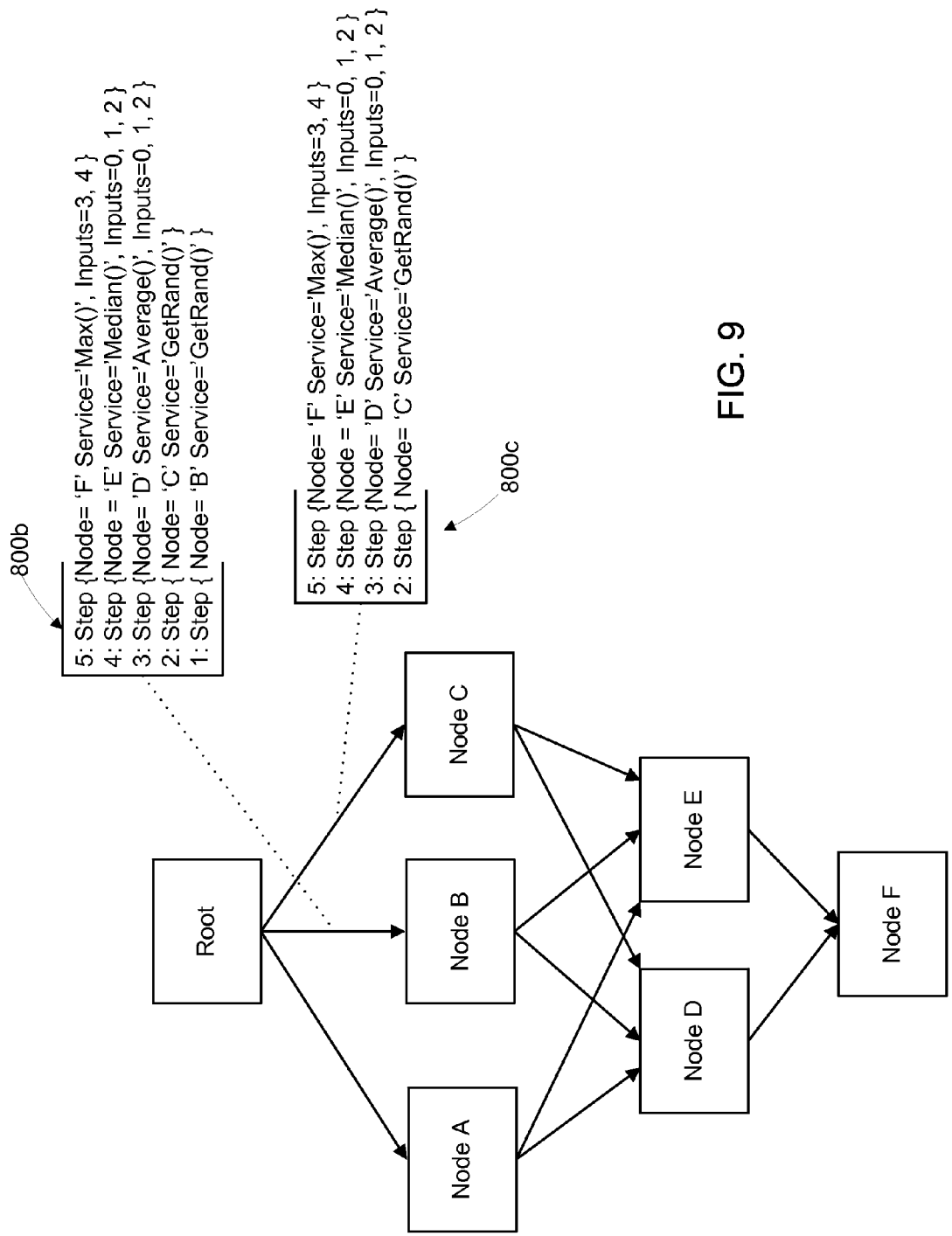
FIGS. 9-11 illustrate the pruning of steps from the processing plan of FIG. 8 as the processing plan flows through the processing nodes.

For example, before sending the processing plan to a particular node, the root node may prune any steps from the end of the processing plan that occur after the particular node. Because the processing plan is forward looking, steps that occur after the particular node, when sorted in reverse topological order, are not needed by the particular node to finish execution of the processing plan. In the example of FIG. 8 no steps occur after step 0, which contains node A, so the root node may send the entire processing plan 800 to node A. But the root node may prune step 0 from the processing plan before sending the processing plan to node B, because step 0 occurs after step 1 in the reverse topological list. FIG. 9 illustrates the pruned plan 800*b* that the root node may send to node B. Similarly, the root node may send pruned plan 800*c* to node C, which has steps 1 and 0 removed. Node C does not need to know about nodes A and B to perform its task and to determine where to send its output.

Figure 10:
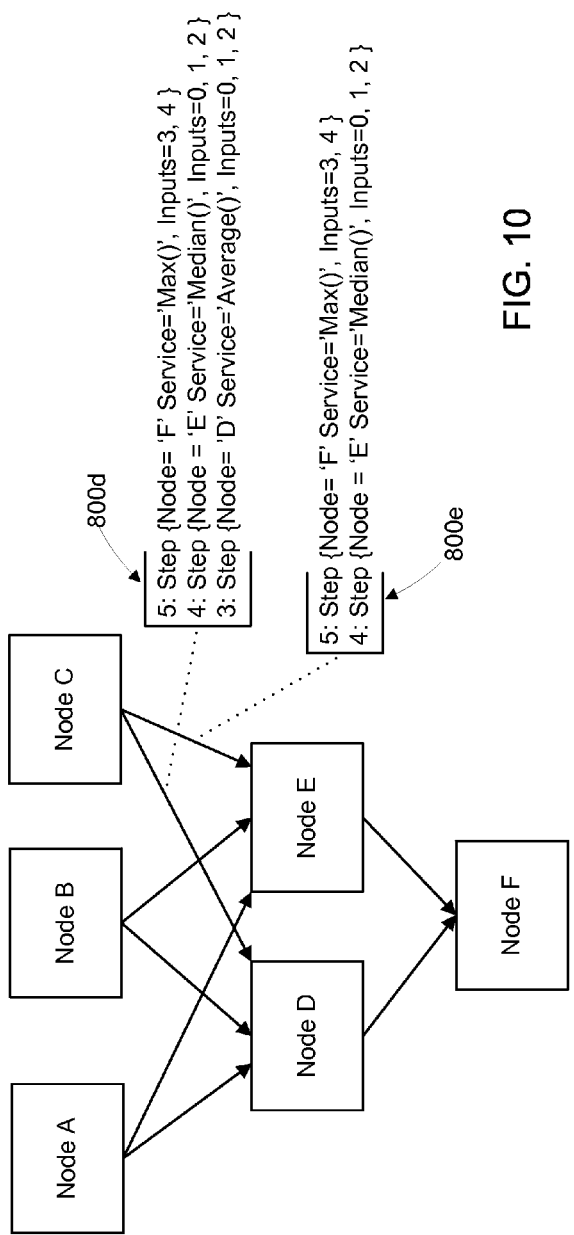
Figure 11:
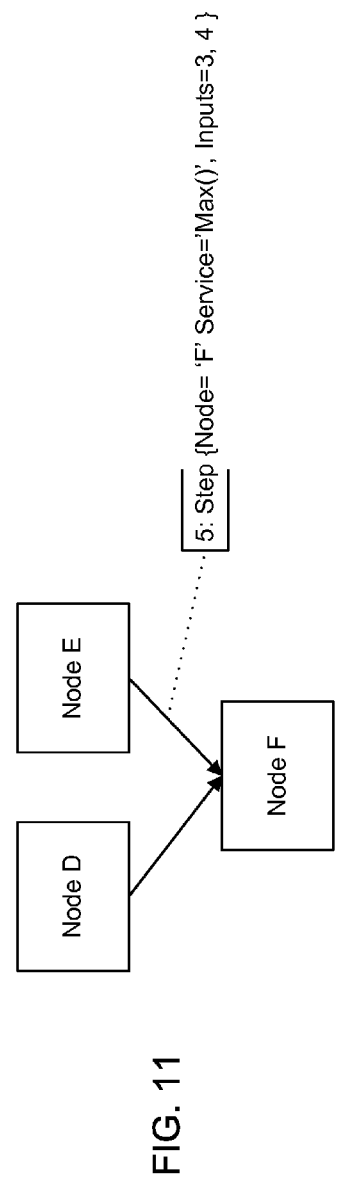

After finishing the service at node C, for example, node C may further prune the processing plan, sending the steps needed to finish. For example, node C may send processing plan 800*d* to node D and 800*e* to node E, as illustrated in FIG. 10. In the example of FIG. 10, node E receives three inputs, and therefore three processing plans. Node E may ignore the second and third copies of the processing plan it receives. To finish the example, when node E completes processing of its service, it may prune the processing plan, so that only one step of the processing plan is sent to node F, as illustrated in FIG. 11. As illustrated, each time the processing plan is forwarded, the plan itself becomes smaller, using less memory during the transmission. While such memory savings may seem trivial for small plans, the savings may be substantial for large, complex processing plans or for distributed systems with many, e.g., hundreds or thousands, of nodes.

Of course, in some implementations the processing plan may be sorted in ascending topological order. In such implementations the processing plan executor at each node may prune from the top of the processing plan, rather from the end. In either method, the distributed system may reduce the bytes used to transport the processing plan. Also, as FIGS. 8-11 illustrate, a processing plan may specify one node per step. Thus, while processing tree 850 of FIG. 8 looks the same as processing tree 250 of FIG. 2, processing plans 200 and 800 differ in the number of nodes specified in each step. However, pruning may occur for either type of processing plan.

Figure 12:
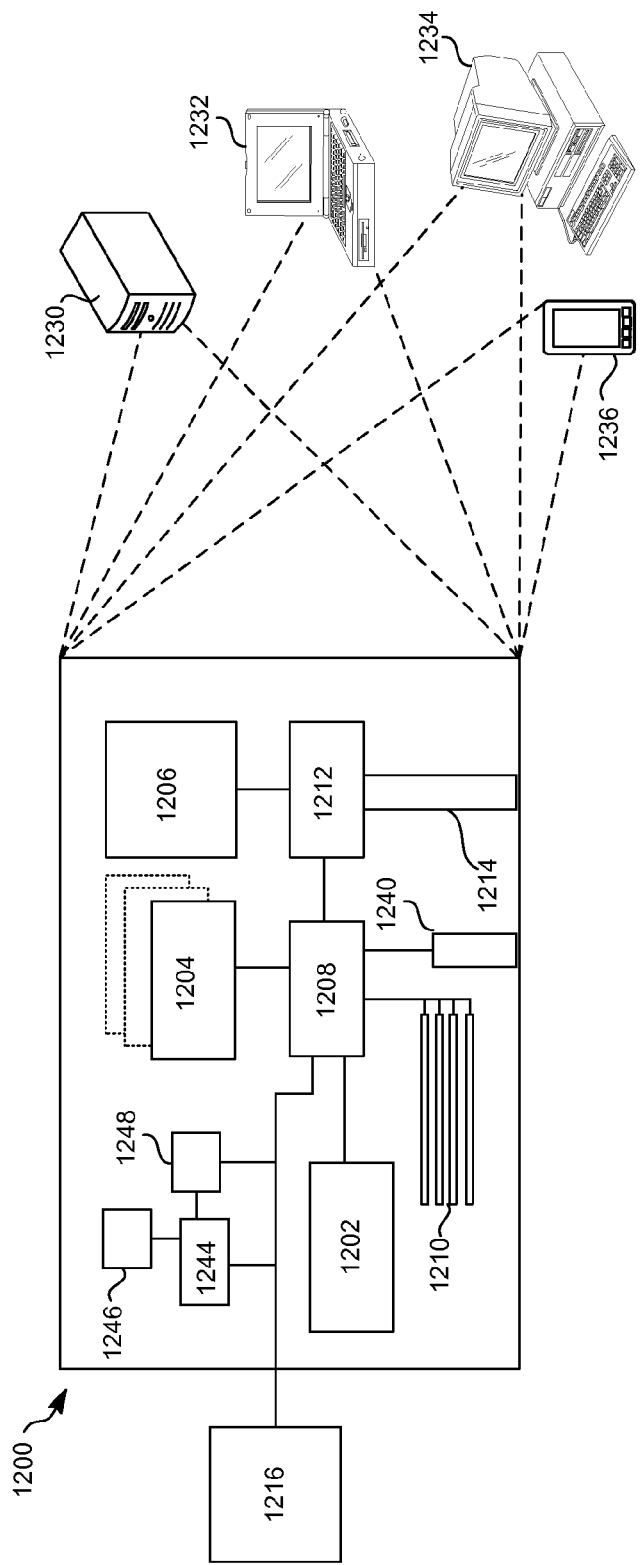
FIG. 12 shows an example of a computer device that can be used to implement the described techniques.

FIG. 12 shows an example of a generic computer device 1200, which may be system 100, and/or client 170 of FIG. 1, which may be used with the techniques described here. Computing device 1200 is intended to represent various example forms of computing devices, such as laptops, desktops, workstations, personal digital assistants, cellular telephones, smart phones, tablets, servers, and other computing devices, including wearable devices. The components shown here, their connections and relationships, and their functions, are meant to be examples only, and are not meant to limit implementations of the inventions described and/or claimed in this document.

Computing device 1200 includes a processor 1202, memory 1204, a storage device 1206, and expansion ports 1210 connected via an interface 1208. In some implementations, computing device 1200 may include transceiver 1246, communication interface 1244, and a GPS (Global Positioning System) receiver module 1248, among other components, connected via interface 1208. Device 1200 may communicate wirelessly through communication interface 1244, which may include digital signal processing circuitry where necessary. Each of the components 1202, 1204, 1206, 1208, 1210, 1240, 1244, 1246, and 1248 may be mounted on a common motherboard or in other manners as appropriate.

The processor 1202 can process instructions for execution within the computing device 1200, including instructions stored in the memory 1204 or on the storage device 1206 to display graphical information for a GUI on an external input/output device, such as display 1216. Display 1216 may be a monitor or a flat touchscreen display. In some implementations, multiple processors and/or multiple buses may be used, as appropriate, along with multiple memories and types of memory. Also, multiple computing devices 1200 may be connected, with each device providing portions of the necessary operations (e.g., as a server bank, a group of blade servers, or a multi-processor system).

The memory 1204 stores information within the computing device 1200. In one implementation, the memory 1204 is a volatile memory unit or units. In another implementation, the memory 1204 is a non-volatile memory unit or units. The memory 1204 may also be another form of computer-readable medium, such as a magnetic or optical disk. In some implementations, the memory 1204 may include expansion memory provided through an expansion interface.

The storage device 1206 is capable of providing mass storage for the computing device 1200. In one implementation, the storage device 1206 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in such a computer-readable medium. The computer program product may also contain instructions that, when executed, perform one or more methods, such as those described above. The computer- or machine-readable medium is a storage device such as the memory 1204, the storage device 1206, or memory on processor 1202.

The interface 1208 may be a high speed controller that manages bandwidth-intensive operations for the computing device 1200 or a low speed controller that manages lower bandwidth-intensive operations, or a combination of such controllers. An external interface 1240 may be provided so as to enable near area communication of device 1200 with other devices. In some implementations, controller 1208 may be coupled to storage device 1206 and expansion port 1214. The expansion port, which may include various communication ports (e.g., USB, BLUETOOTH, Ethernet, wireless Ethernet) may be coupled to one or more input/output devices, such as a keyboard, a pointing device, a scanner, or a networking device such as a switch or router, e.g., through a network adapter.

The computing device 1200 may be implemented in a number of different forms, as shown in the figure. For example, it may be implemented as a standard server 1230, or multiple times in a group of such servers. It may also be implemented as part of a rack server system. In addition, it may be implemented in a personal computer such as a laptop computer 1232, or smart phone 1236. An entire system may be made up of multiple computing devices 1200 communicating with each other. Other configurations are possible.

FIG. 13 shows an example of a generic computer device 1300, which may be system 100 of FIG. 1, which may be used with the techniques described here. Computing device 1300 is intended to represent various example forms of large-scale data processing devices, such as servers, blade servers, datacenters, mainframes, and other large-scale computing devices. Computing device 1300 may be a distributed system having multiple processors, possibly including network attached storage nodes, that are interconnected by one or more communication networks. The components shown here, their connections and relationships, and their functions, are meant to be examples only, and are not meant to limit implementations of the inventions described and/or claimed in this document.

Distributed computing system 1300 may include any number of computing devices 1380. Computing devices 1380 may include a server or rack servers, mainframes, etc. communicating over a local or wide-area network, dedicated optical links, modems, bridges, routers, switches, wired or wireless networks, etc.

In some implementations, each computing device may include multiple racks. For example, computing device 1380a includes multiple racks 1358a-1358n. Each rack may include one or more processors, such as processors 1352a-1352n and 1362a-1362n. The processors may include data processors, network attached storage devices, and other computer controlled devices. In some implementations, one processor may operate as a master processor and control the scheduling and data distribution tasks. Processors may be interconnected through one or more rack switches 1358, and one or more racks may be connected through switch 1378. Switch 1378 may handle communications between multiple connected computing devices 1300.

Each rack may include memory, such as memory 1354 and memory 1364, and storage, such as 1356 and 1366. Storage 1356 and 1366 may provide mass storage and may include volatile or non-volatile storage, such as network-attached disks, floppy disks, hard disks, optical disks, tapes, flash memory or other similar solid state memory devices, or an array of devices, including devices in a storage area network or other configurations. Storage 1356 or 1366 may be shared between multiple processors, multiple racks, or multiple computing devices and may include a computer-readable medium storing instructions executable by one or more of the processors. Memory 1354 and 1364 may include, e.g., volatile memory unit or units, a non-volatile memory unit or units, and/or other forms of computer-readable media, such as a magnetic or optical disks, flash memory, cache, Random Access Memory (RAM), Read Only Memory (ROM), and combinations thereof. Memory, such as memory 1354 may also be shared between processors 1352a-1352n. Data structures, such as an index, may be stored, for example, across storage 1356 and memory 1354. Computing device 1300 may include other components not shown, such as controllers, buses, input/output devices, communications modules, etc.

An entire system, such as system 100, may be made up of multiple computing devices 1300 communicating with each other. For example, device 1380a may communicate with devices 1380b, 1380c, and 1380d, and these may collectively be known as system 100. As another example, system 100 of FIG. 1 may include one or more computing devices 1300 as root node 120, and one or more computing devices 1300 as processing nodes 150. Furthermore, some of the computing devices may be located geographically close to each other, and others may be located geographically distant. The layout of system 1300 is an example only and the system may take on other layouts or configurations.

Various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any non-transitory computer program product, apparatus and/or device (e.g., magnetic discs, optical disks, memory (including Read Access Memory), Programmable Logic Devices (PLDs)) used to provide machine instructions and/or data to a programmable processor.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, various modifications may be made without departing from the spirit and scope of the invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A system comprising:
a memory storing a plurality of processing plans, each processing plan including of a series of operations to be performed, each operation including:
 a service, and
 an indication of at least one of a plurality of processing nodes for performing the service,
 wherein at least one operation of the series of operations, also includes an indication of one or more inputs representing an output of another operation of the series of operations;
a first node of the plurality of nodes, wherein the first node includes at least one processor and a memory storing instructions that, when executed by the at least one processor, cause the first node to:
 select a particular processing plan from the memory, and
 distribute the particular processing plan to second nodes of the plurality of processing nodes, the second nodes being identified in at least one first operation of the particular processing plan, the first operation having no indication of a previous operation; and
the plurality of processing nodes, each processing node including at least one processor and a memory storing instructions that, when executed by the at least one processor, cause the processing node to:
 receive a processing plan of the plurality of processing plans,
 determine an anticipated number of inputs, each input being identified in the processing plan as an output from a previous operation,
 determine whether the anticipated number of inputs has been received, and perform the service indicated in the first operation of the received processing plan when it is determined that the anticipated number of inputs have been received.

2. The system of claim 1, each of the plurality of nodes including a networking layer for communicating the processing plans between the processing nodes.

3. The system of claim 1, wherein as part of determining whether the anticipated number of inputs has been received and performing the service, each of the plurality of nodes is further configured to:
  determine whether a predetermined amount of time has passed prior to receiving the anticipated number of inputs; and
  perform the service indicated with the received inputs when it is determined that the predetermined amount of time has passed.

4. The system of claim 1, wherein at least one of the operations in the series of operations in the received processing plan includes a partial service and, as part of performing the service, each of the plurality of nodes is further configured to:
  perform the partial service using each of the anticipated inputs to create an output; and
  use the output of the partial service as input to the service indicated in the received processing plan.

5. The system of claim 1, wherein the instructions, when executed by the at least one processor, cause the second processing nodes to perform the operations of:
  receiving the particular processing plan from the first node;
  executing the service indicated in the first operation to generate a particular output;
  identifying at least one later operation identifying the first operation; and
  sending the particular processing plan and the particular output to third processing nodes identified in the at least one later operation.

6. The system of claim 5, wherein the instructions, when executed by the at least one processor, cause the second processing nodes to perform the operations of:
  removing at least one operation from the processing plan to generate a modified processing plan; and
  sending the modified processing plan with the output to the third processing nodes.

7. The system of claim 5, wherein the second nodes are configured to begin execution of the service concurrently.

8. The system of claim 5, wherein as part of executing the service indicated in the first operation, at least one of the second processing nodes initiates another processing plan.

9. The system of claim 8, wherein as part of initiating the another processing plan, the at least one of the second processing nodes appends additional steps to the particular processing plan.

10. The system of claim 9, wherein as part of initiating the another processing plan, the at least one of the second processing nodes modifies the indication of the one or more inputs of the later operation in the processing plan.

11. The system of claim 1, wherein the first node is configured to send the processing plan to the second nodes without receiving an acknowledgement from the second nodes.

12. A computer-implemented method comprising:
  receiving a processing plan at a processing node, the processing plan including a series of operations to be performed, each operation including:
    a service for the operation, and
    an indication of one or more processing nodes for performing the service,
    wherein at least one operation also includes an indication of a prior operation, so that the at least one operation uses an output of the prior operation as input;
  determine an anticipated number of inputs for a particular operation, the particular operation identifying the processing node in the processing plan, each input being identified in the processing plan as an output from a previous operation;
  determine whether the anticipated number of inputs has been received;
  performing a service indicated in the particular operation at the processing node when the anticipated number of inputs has been received;
  determining a next operation based on the processing plan, the next operation having an indication of the particular operation; and
  sending the processing plan from the processing node to another processing node, the another processing node being identified in the next operation.

13. The method of claim 12, wherein the series of operations is an array of operations and the indication of a prior operation is an index into the array.

14. The method of claim 12, wherein the processing plan includes a partial service and the method further comprises performing the partial service on an input as it arrives at the processing node, prior to performing the service.

15. The method of claim 12, wherein the processing plan specifies that the processing nodes are replicated and performing the service further comprises:
  cancelling the performing of the service at other processing nodes identified in the particular operation after completion of the service.

16. The method of claim 12, wherein the operations of the processing plan are stored in reverse topological order.

17. The method of claim 16, wherein the method further comprises:
  pruning operations occurring after the next operation from the processing plan prior to sending the processing plan to the another processing node.

18. The method of claim 12, wherein the processing node sends the processing plan to the another processing node without expecting a reply from the another processing node as a result of the another processing node performing the service indicated in the next operation.

19. The method of claim 12, wherein the indication of the one or more processing nodes in the processing plan is a naming service.

20. The method of claim 12, wherein the indication of the one or more processing nodes in at least one operation of the processing plan represents a plurality of processing nodes.

21. A distributed processing system comprising:
  a plurality of processing nodes, each processing node including:
    at least one processor,
    a networking layer for communicating with other processing nodes of the plurality of processing nodes; and
    a memory storing instructions that, when executed by the at least one processor cause the processing node to:
      use the networking layer to receive a processing plan that includes a series of operations to be performed,
      analyze the processing plan to determine a service to perform and a number of inputs anticipated for the service, each input being identified in the processing plan as an output of a previous operation, and perform the service when the anticipated number of inputs has been received, wherein the processing plan defines a processing tree comprising a subset of the plurality of processing nodes, the processing tree having unidirectional communication from the root to a final level of the tree.

22. The system of claim 21, wherein the distributed processing system includes a root node, the root node including:
   at least one processor,
   a networking layer for communicating with the plurality of processing nodes; and
   a memory storing instructions that, when executed by the at least one processor cause the root node to:
      select the processing plan,
      send the processing plan to a next node using the networking layer, the next node being a child of the root node in the processing tree,
      wherein the next node performs a service indicated by the processing plan.

23. The system of claim 21, wherein as part of performing the service the memory of at least one processing node further includes instructions that, when executed by the at least one processor, cause the at least one processing node to initiate execution of another processing plan, the another processing plan providing an output to children of the at least one processing node, the children being determined by the processing tree.

24. The system of claim 21, wherein as part of analyzing the processing plan the memory further includes instructions that, when executed by the at least one processor, cause the processing node to:
   determine a partial service to perform;
   perform the partial service on the anticipated inputs as they arrive; and
   use output of the partial service as input for the service.

25. The system of claim 21, wherein as part of performing the service the memory further includes instructions that, when executed by the at least one processor, cause the processing node to:
   determine whether a predetermined amount of time has passed prior to receiving a first input of the anticipated number of inputs; and
   perform the service without receiving the first input.

* * * * *